United States Patent
Chandrasekhar et al.

(10) Patent No.: US 10,014,991 B2
(45) Date of Patent: Jul. 3, 2018

(54) METHODS FOR LONG TERM EVOLUTION (LTE) TRANSMISSION BURSTS TO IMPROVE SPECTRAL EFFICIENCY IN UNLICENSED FREQUENCY CHANNELS AND INDOOR SCENARIOS

(71) Applicant: Cisco Technology, Inc., San Jose, CA (US)

(72) Inventors: Vikram Chandrasekhar, Mountain View, CA (US); James Seymour, North Aurora, IL (US); Rajesh Pazhyannur, Fremont, CA (US); Andrew Myles, Turramurra (AU)

(73) Assignee: Cisco Technology, Inc., San Jose, CA (US)

(*) Notice: Subject to any disclaimer, the term of this patent is extended or adjusted under 35 U.S.C. 154(b) by 184 days.

(21) Appl. No.: 14/881,479

(22) Filed: Oct. 13, 2015

(65) Prior Publication Data

US 2016/0135185 A1    May 12, 2016

Related U.S. Application Data

(60) Provisional application No. 62/076,577, filed on Nov. 7, 2014.

(51) Int. Cl.
| | |
|---|---|
| *H04L 5/00* | (2006.01) |
| *H04W 16/14* | (2009.01) |
| *H04W 72/12* | (2009.01) |
| *H04L 5/14* | (2006.01) |

(52) U.S. Cl.
CPC ........ *H04L 5/0007* (2013.01); *H04L 5/0032* (2013.01); *H04L 5/0044* (2013.01); *H04L 5/0071* (2013.01); *H04L 5/0087* (2013.01); *H04L 5/0091* (2013.01); *H04W 16/14* (2013.01); *H04W 72/1278* (2013.01); *H04L 5/14* (2013.01); *H04W 72/1263* (2013.01)

(58) Field of Classification Search
None
See application file for complete search history.

(56) References Cited

U.S. PATENT DOCUMENTS

| | | |
|---|---|---|
| 2006/0223448 A1 | 10/2006 | Kruys |
| 2011/0205986 A1 | 8/2011 | Medapalli |
| 2014/0036818 A1 | 2/2014 | Koskela et al. |
| 2014/0269605 A1* | 9/2014 | Pecen ............... H04W 56/00 370/330 |
| 2015/0043523 A1 | 2/2015 | Luo et al. |
| 2015/0063148 A1 | 3/2015 | Sadek |

(Continued)

*Primary Examiner* — Edan Orgad
*Assistant Examiner* — Saumit Shah
(74) *Attorney, Agent, or Firm* — Edell, Shapiro & Finnan, LLC (57) ABSTRACT

Modifications to frame/subframe structure are presented herein so that a wireless device can transmit its data within a fraction of a subframe. The device obtains data to be transmitted in an unlicensed spectrum and determines whether an entire subframe is required to completely communicate the data. If the data is small enough to not require the entire subframe, then the device generates a burst transmission to minimize the time period of the subframe used to communicate the data. The device transmits the burst transmission and a parameter indicating the duration of the burst transmission.

21 Claims, 6 Drawing Sheets

(56) References Cited

U.S. PATENT DOCUMENTS

| | | | | |
|---|---|---|---|---|
| 2015/0195849 A1* | 7/2015 | Bashar | ................. | H04W 16/14 370/330 |
| 2015/0215097 A1* | 7/2015 | Yi | ........................ | H04W 52/48 370/329 |
| 2015/0280871 A1* | 10/2015 | Xu | .................... | H04W 72/0446 370/330 |
| 2016/0095110 A1* | 3/2016 | Li | ..................... | H04W 72/1215 370/329 |

* cited by examiner

METHODS FOR LONG TERM EVOLUTION (LTE) TRANSMISSION BURSTS TO IMPROVE SPECTRAL EFFICIENCY IN UNLICENSED FREQUENCY CHANNELS AND INDOOR SCENARIOS

CROSS-REFERENCE TO RELATED APPLICATION

This application claims priority to U.S. Provisional Application No. 62/076,577, filed Nov. 7, 2014, the entirety of which is incorporated herein by reference.

TECHNICAL FIELD

The present disclosure relates to wireless networks.

BACKGROUND

The existing Long Term Evolution (LTE) waveform structure involves an LTE subframe occupying one millisecond (ms) in time, with its frequency domain resource occupancy being primarily dependent on the traffic pay load size, channel quality etc. In an unlicensed frequency band, due to a region-specific regulation requiring a listen-before-talk mechanism in devices to determine if the medium is busy, an on-going LTE transmission can potentially prevent these devices from accessing the medium. The 1 ms subframe structure is especially inefficient at low-to-medium traffic loads where the LTE transmissions are typically frequency sparse. The inefficiency may manifest across two dimensions. In one case, inefficiency in low-to-medium traffic results in poor resource utilization of valuable unlicensed spectrum over a 1 ms time interval. Additionally, the time occupied by a sequence of 1 ms LTE subframes could have been better utilized by more agile technologies such as Wi-Fi, which can operate with much smaller waveform durations. This inefficiency results in sub-optimal performance from overall system perspective.

DESCRIPTION OF EXAMPLE EMBODIMENTS

Overview

In one embodiment, data is obtained to be wirelessly transmitted in a frame in an unlicensed spectrum. A determination is made as to whether the data requires an entire subframe of the LTE radio frame to completely communicate the data. When it is determined that the data does not require the entire subframe, a burst transmission is generated so as to minimize a time period of the subframe used to communicate the data. The transmitter transmits the burst transmission and also transmits a parameter indicating the duration of the burst transmission.

DETAILED DESCRIPTION

Modifications to a frame structure, such as the LTE frame structure, are presented herein so that a device can transmit data within a fraction of a subframe (as opposed to always using the entirety of the one millisecond subframe). This is useful in unlicensed frequency channels where multiple radio access technologies (e.g. Wi-Fi®, LTE) contend for medium access and can help improve co-existence performance of LTE and IEEE 802.11 (i.e., Wi-Fi) links in terms of spectral efficiency particularly in low-to-medium load scenarios. While the examples presented herein refer to LTE operations in unlicensed frequency band(s), these use-cases are not meant to be limiting and these techniques can be used in any frame/subframe structure so as to minimize a time duration of a transmission.

The typical LTE subframe structure consists of two slots each of 0.5 ms duration. Each slot comprises either 6 or 7 Orthogonal Frequency Division Multiplex (OFDM) symbols depending on whether extended or normal cyclic prefix is used. The resources for each User Equipment (UE) on a given subframe for downlink (and respective uplink) transmission are conveyed through a downlink (and respective uplink) scheduling grant signalled via the Physical Downlink Control Channel (PDCCH) which can occupy between 1-3 symbols for system bandwidths greater than 1.8 MHz.

Given a grant size equaling $N_{RB}$ the transmitted signal in each slot for that UE occupies $N_{SC,RB} \times N_{RB}$ subcarriers in frequency domain, assuming subcarrier spacing=15 kHz, $N_{SC,RB}=12$. The LTE Downlink is self-scheduled, i.e., the downlink data is sent in the same subframe as the downlink grant. For LTE-Frequency Division Duplex (LTE-FDD), the Uplink has a four millisecond latency between time of uplink grant reception and time of uplink data transmission from the UE. For LTE-Time Division Duplex (LTE-TDD), the latency between time of uplink grant reception and time of uplink data transmission is dependent on the TDD configuration.

Figure 1:
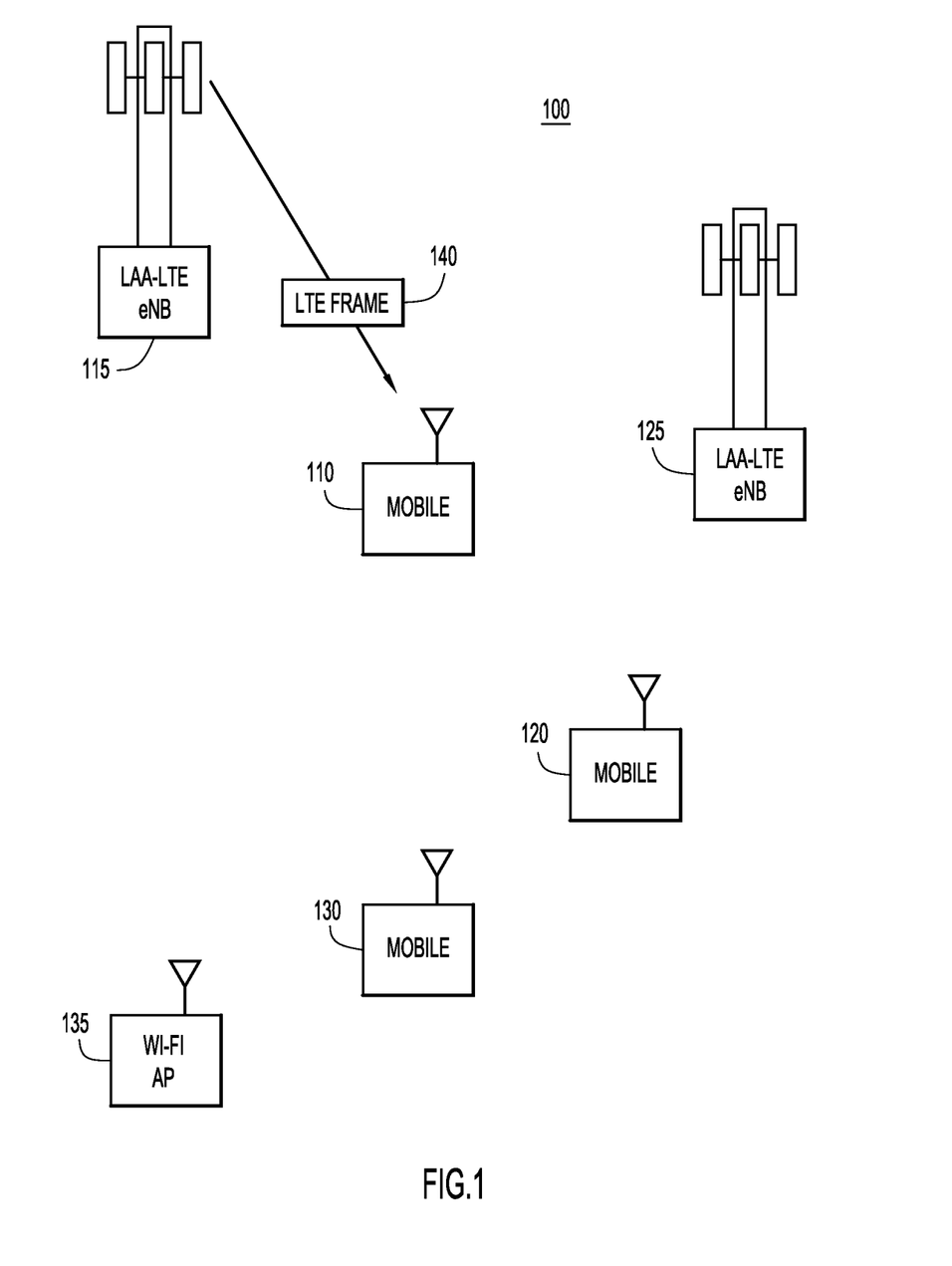
FIG. 1 illustrates a simplified block diagram of an example deployment scenario in which the techniques presented herein may be used, according to an example embodiment.

Referring now to FIG. 1, a system 100 is shown as an example scenario for which the methods presented herein may be used. System 100 includes a mobile device 110 (e.g., an LTE UE) that communicates wirelessly with an LTE evolved Node B (eNB) 115 at least partially over an unlicensed spectrum (unlicensed frequency band, such as the 5 GHz frequency band in the United States). The communication over the unlicensed spectrum may be coordinated with communication over a licensed spectrum using, for example, a License Assisted Access (LAA) system. A second mobile device 120 (e.g., another LTE UE) communicates with a second LTE eNB 125 over the same unlicensed spectrum as used by the LTE eNB 115. In one example, the second LTE eNB 125 may use the same licensed spectrum or a different licensed spectrum as the first LTE eNB 115. Additionally, a third mobile device 130 (e.g., a Wi-Fi station) communicates with a Wi-Fi access point (AP) 135 using the same unlicensed spectrum as used by the LTE eNBs 115 and 125.

When an LTE eNB uses the unlicensed spectrum for transmissions, it is desired to maximize spectrum efficiency to ensure that a given link (e.g. between the LTE-eNB 115 and the UE 110) can access the unlicensed channel with minimal latency. Additionally, maximizing spectrum efficiency ensures that a given transmitter link can co-exist with other links (e.g., LAA-LTE or Wi-Fi) by occupying the medium for as little time as possible, while utilizing the unlicensed spectrum to the fullest extent when it does occupy the medium. The Wi-Fi physical layer/media access control layer (PHY/MAC) is already optimized for short time occupancy and for co-existence with other Wi-Fi devices in unlicensed spectrum and for indoor deployments. However, in an unlicensed spectrum an existing LAA-LTE subframe structure may result in loss of spectral efficiency and loss of fairness, since a single LAA-LTE transmitter occupies one millisecond in time even if it is transmitting a small payload to a single UE.

In one use case, over a 20 MHz unlicensed frequency channel, a one millisecond subframe may be used to serve Voice over Internet Protocol (VoIP) traffic (e.g., 100 bytes without Robust Header Compression (RoHC) assuming highest codec rate) for 1 UE, which typically requires just 5-10 resource blocks (between 0.9-1.8 MHz). This implies that the available time/frequency resources are not used in a spectrally efficient manner (e.g., only 10% of the unlicensed channel bandwidth is used). Adding Listen-before-Talk (LBT) capability at the LAA-LTE device does not address this problem. There is a loss of fairness since a more heavily loaded LAA-LTE link or a Wi-Fi link could have used that time in a more spectrally-efficient manner.

The system 100 may use the methods presented herein to optimize an LAA-LTE transmission to make the minimum time granularity smaller than one millisecond. This can quickly relinquish the medium to other LAA-LTE and Wi-Fi devices if the transmission payload is small (e.g. VoIP). This enables a more spectrally efficient usage of unlicensed frequency bands.

Figure 2:
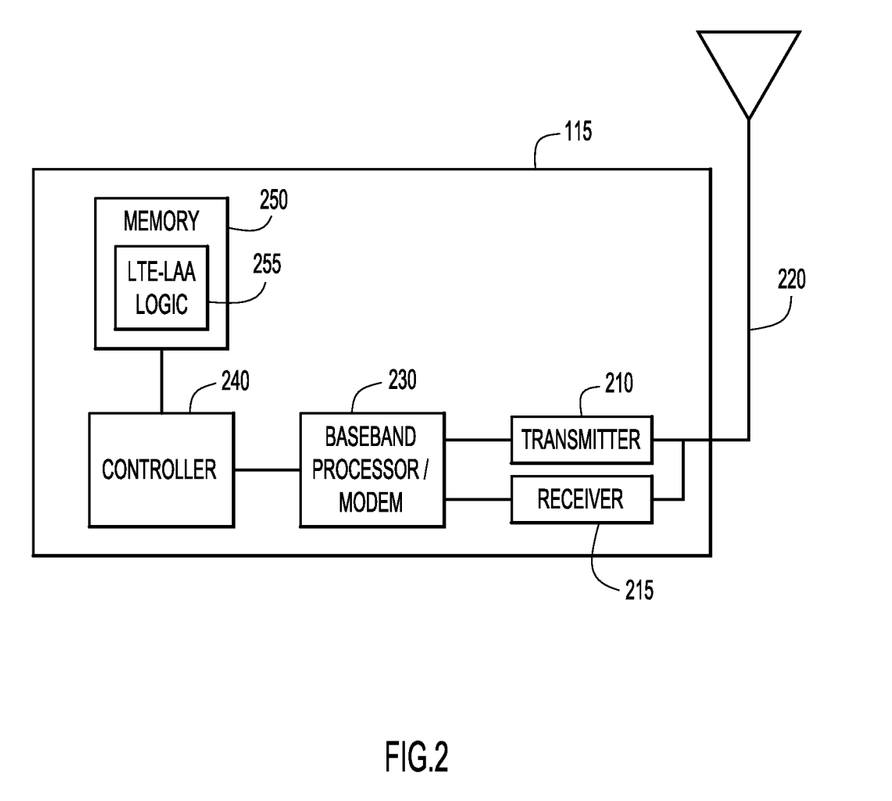
FIG. 2 illustrates a block diagram of an LTE device configured to perform the techniques presented herein, according to an example embodiment.

Referring now to FIG. 2, a simplified block diagram illustrates a wireless device, e.g., LTE eNB 115, configured to perform the methods presented herein. The LTE eNB 115 is shown as an example of a wireless device, but other wireless devices (e.g., UE 110) may include similar components that perform similar methods. The wireless device 115 includes a transmitter 210 (or multiple transmitters), a receiver 215 (or multiple receivers), an antenna 220, a baseband processor 230 (e.g., a modem), and a controller 240 (e.g., a processor such as a microprocessor or microcontroller). The baseband processor 230 may perform media access control (MAC) functions as well as physical layer (PHY) functions. The methods presented herein may be implemented by control logic in the baseband processor 230. The control logic may take the form of fixed or programmable digital logic gates. In another form, the control logic may be implemented by instructions stored/encoded in memory 250 (e.g., LTE-LAA logic 255) and executed by the controller 240. Additionally, the wireless device 115 may include a wired network interface unit (not shown) to communicate with other computing devices over a wired network.

The memory 250 may include read only memory (ROM), random access memory (RAM), magnetic disk storage media devices, optical storage media devices, flash memory devices, electrical, optical, or other physical/tangible memory storage devices. Thus, in general, the memory 250 may comprise one or more tangible (non-transitory) computer readable storage media (e.g., a memory device) encoded with software comprising computer executable instructions and when the software is executed (by the controller 240) it is operable to perform the operations described herein.

Figure 3:
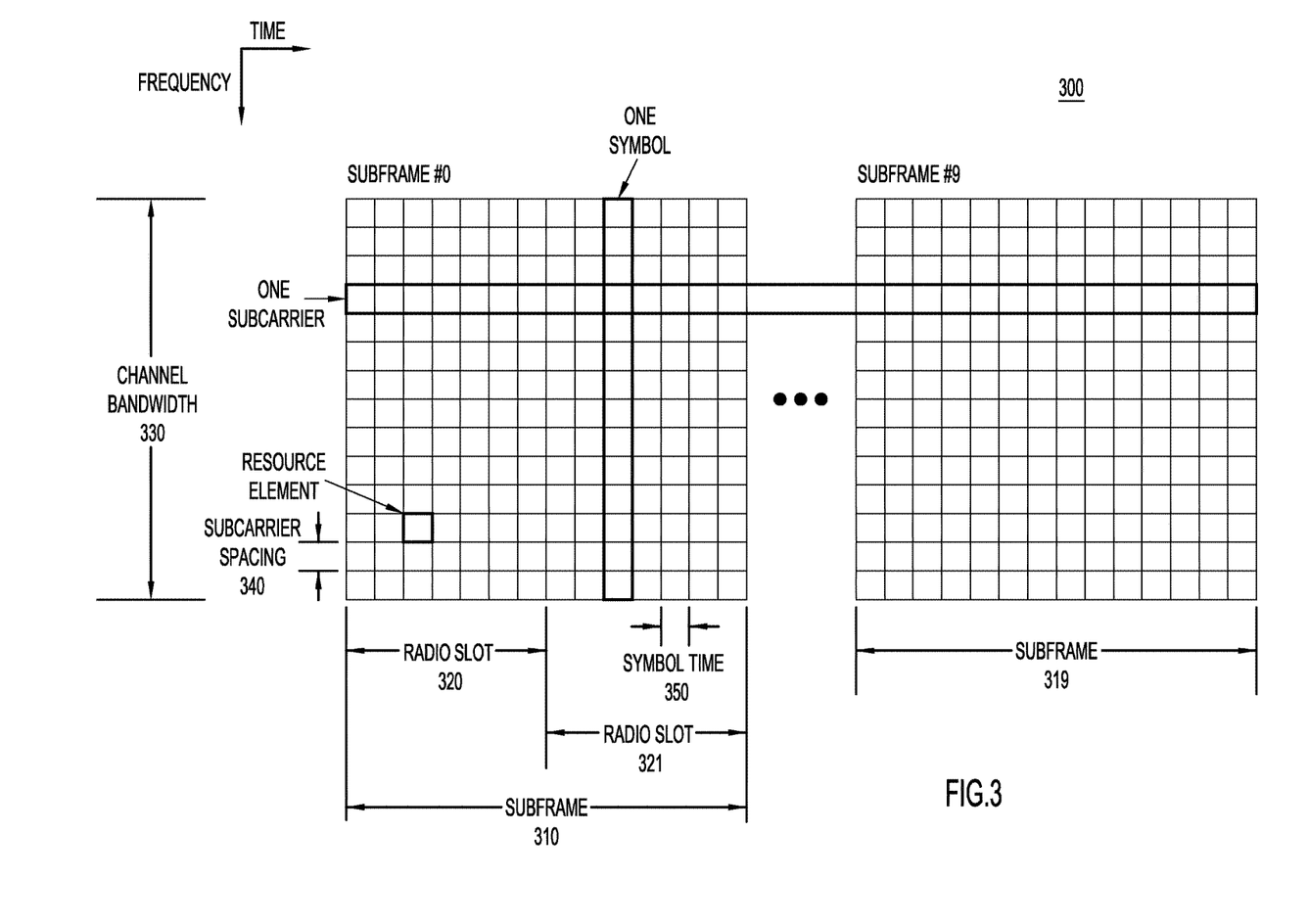
FIG. 3 illustrates an example LTE frame/subframe structure, according to an example embodiment.

Referring now to FIG. 3, an example representation of an LTE frame 300 is shown. The depiction of frame 300 plots the frequency channels along the vertical axis, with one subcarrier represented by a row. The time slots of the frame 300 are depicted across the horizontal axis, with one symbol transmission being represented by a column. Each block where a subcarrier row and a symbol column intersect represents a single resource element. One or more resource elements may be group to form a resource block.

LTE frame 300 is divided into ten subframes 310-319. As an example, subframe 310 is divided into two radio slots 320 and 321. The total channel bandwidth 330 of the frame is a combination of all of the subcarriers at a specific subcarrier spacing 340. Typically, LTE frames are transmitted with a subcarrier spacing 340 value of 15 kHz, which correlates to a radio slot of six or seven Orthogonal Frequency Division Multiplexed (OFDM) symbols taking 0.5 milliseconds, and an entire frame taking 10 milliseconds to transmit. The symbol time 350, i.e., the time it takes to transmit one symbol, is inversely related to the subcarrier spacing 340. By increasing the subcarrier spacing 340, the symbol time 350 is decreased.

In one example, e.g., for both uplink/downlink (UL/DL) access for LAA-LTE indoor deployment scenarios, an LTE subcarrier spacing 340 of 240 kHz (corresponding to 128 subcarriers per OFDM symbol) is provided. This would exploit the higher coherence bandwidth indoors and the greater subcarrier spacing 340 enables the usage of a shorter symbol time 350. A subcarrier spacing mode of 240 kHz corresponds to a symbol time of 41.67 us (or about 240 OFDM symbols in one subframe). The subcarrier spacing mode (whether 7.5 KHz or 15 KHz or 240 KHz) on an unlicensed (secondary) channel may be communicated via Radio Resource Control (RRC) signaling on the licensed (primary) frequency carrier.

Figure 4:
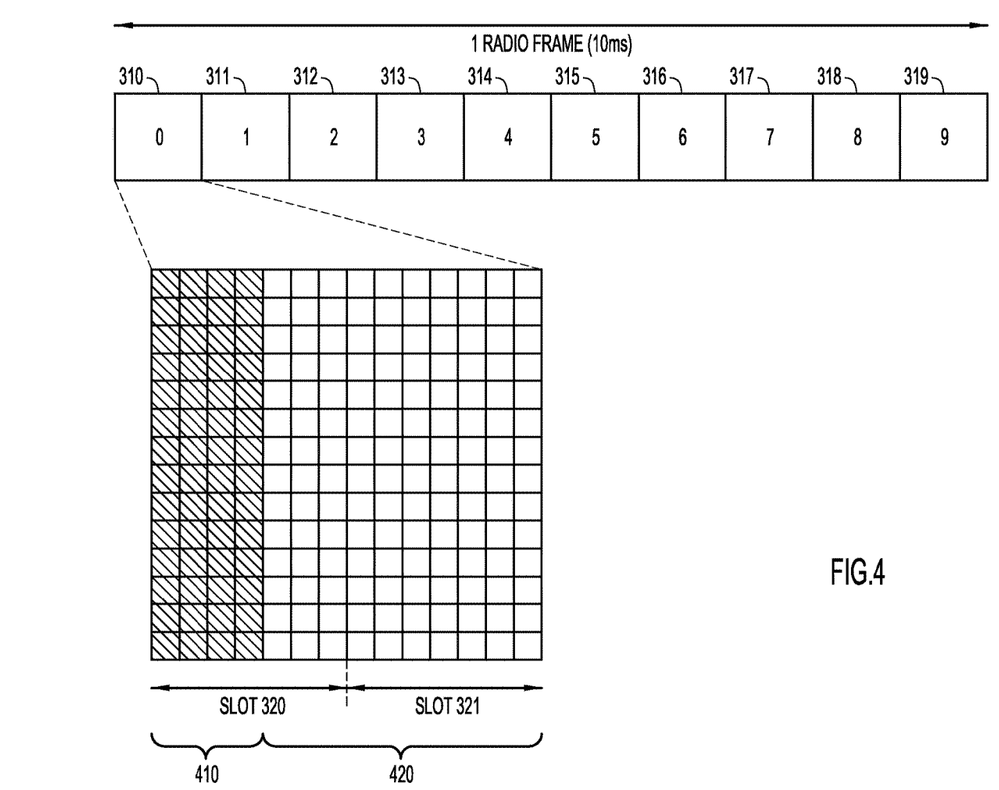
FIG. 4 illustrates a format of a transmission burst made by an LTE device, according to an example embodiment.

Referring now to FIG. 4, an example structure for a transmission burst according to an example embodiment is shown. The data that is to be transmitted in the subframe 310 is capable of being transmitted by using all the subcarriers for the first four symbol times. A transmission burst 410 covers the first four symbols of the subframe 310. After the transmission burst 410, the transmitter is muted for the remainder 420 of the subframe 310. The remainder 420 of the subframe 310 concludes at the end-boundary of the subframe 310. By maximizing the frequency spectrum used to convey the data in the transmission burst 410, the time occupancy of the transmission is minimized, and the medium is quickly relinquished for use by other contending transmitters.

In one example, the LTE transmissions, which may be a downlink (DL) transmission or an uplink (UL) transmission, are generated such that the duration of each DL transmission may be configured to lie between one OFDM symbol and fourteen OFDM symbols (i.e., one subframe). The LTE transmitter employs non-zero energy during the transmission burst 410 (i.e., the shaded resource elements in FIG. 4) to transfer the intended data. The OFDM symbols not part of the transmission burst (i.e., during the remainder 420) are muted (e.g., with zero energy), and thus the medium is unused during the period of time not part of the transmission burst (remainder 420).

The burst opportunity may be aligned with the starting slot boundary in order to not change legacy UE behavior in terms of detecting DL subframe boundaries, e.g., for determining the DL timing and frequency tracking, as well as for applying an UL timing advance. The LTE transmitter mutes (e.g., does not transmit energy) the OFDM symbols in each subframe that are not part of the transmission burst 410. The maximum burst duration may be limited to one millisecond (or fourteen symbols in a single subframe). The method of transmission may be Orthogonal Frequency Division Multiple Access (OFDMA) over the downlink and Single Carrier-Frequency Division Multiple Access (SC-FDMA) over the uplink.

Figure 5:
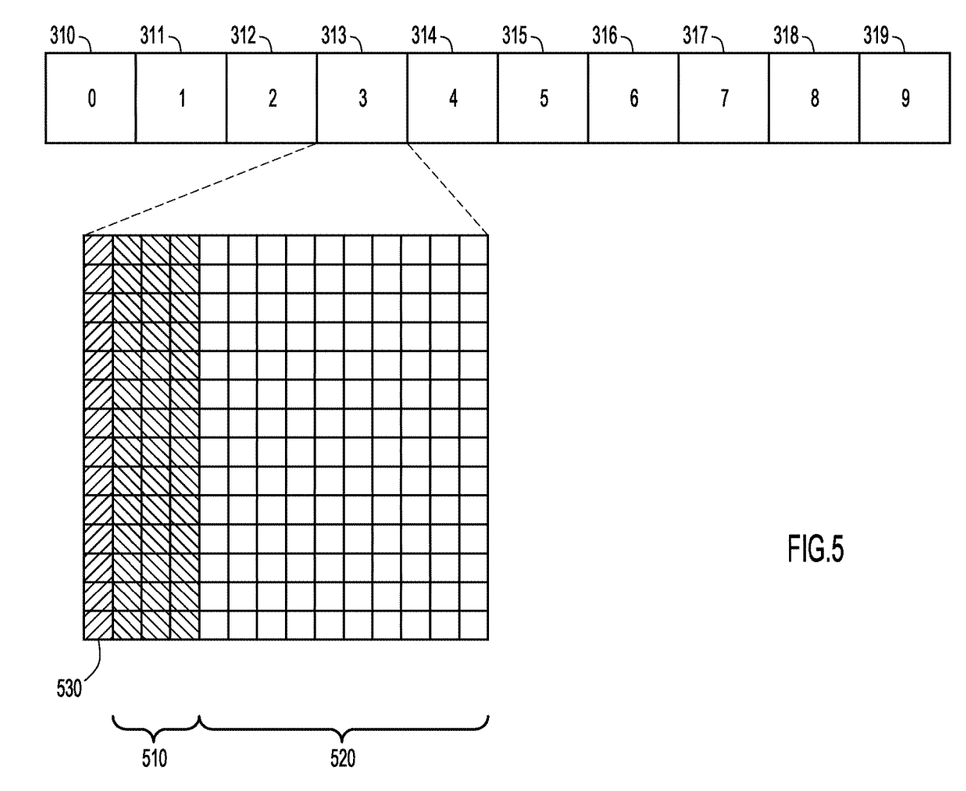
FIG. 5 is a diagram that illustrates methods for communicating the transmit burst duration, according to an example embodiment.

Referring now to FIG. 5, a technique for signaling the transmission burst duration is shown. The data that is to be transmitted in subframe 313 is formatted into a transmission burst 510 with the remainder 520 of the subframe 313 muting the transmitter, similar to the subframe described above with respect to FIG. 4. The initial symbol 530 may be used to signal the duration of the transmission burst 510. This method of signaling the burst duration within each transmission may be configured such that the burst duration is either communicated on each transmit opportunity or communicated in an license-assisted (e.g., signaled via the primary licensed carrier) manner.

In one example, the transmit burst duration is a common cell parameter that can be transmitted on the starting OFDM symbol 530 and signaled either as part of the Physical Downlink Control Channel/Enhanced Physical Downlink Control Channel (PDCCH/EPDCCH) or as a separate signal. In one form, the burst duration may be signaled as a number of OFDM symbols on the starting OFDM symbol(s) following the slot boundary. A single OFDM symbol suffices to convey the duration of the burst transmission in this form.

In another form, the burst duration may be communicated in a number of resource elements (centered around the DC subcarrier) on the starting OFDM symbol(s) following the slot boundary. A single OFDM symbol suffices to convey the duration of the burst transmission in this form.

In still another form, the burst duration may be communicated via the downlink control information (DCI) on the PDCCH/EPDCCH. This signal may be transmitted on either the licensed primary carrier or the unlicensed secondary carrier. In the DL/UL DCI that carries the resource allocation information for the transmission burst, the burst duration is jointly encoded with the locations in the frequency domain of the transmission burst. Alternatively, the burst duration and frequency domain location of the transmission burst may be sent as separate fields within the DL/UL DCI. One use case for this is when the traffic loading is changing often (e.g., order of hundreds of milliseconds), hence the burst duration is communicated via layer 1 (L1)-signaling.

In yet another form, for either the UL or DL, the burst duration is communicated via RRC signaling on the primary (i.e., licensed) carrier. One use-case for this is when the burst duration does not vary too often and hence RRC signaling suffices.

Variants of these methods may be provided wherein the burst duration signaling is jointly encoded with a preamble signature that is used for Clear Channel Assessment by other LAA-LTE/Wi-Fi devices.

As yet another variation, the transmission burst duration per subframe may be predefined to take up to 4 different values (e.g., 0.5 slot or 3 OFDM symbols, 1 slot or 7 OFDM symbols, 1.5 slot or 10 OFDM symbols, 2 slots or 14 symbols). In this variation, a two bit message may be used as part of the accompanying DCI on the PDCCH/EPDCCH signal to signal the transmission burst duration.

When a LTE subframe includes a transmission burst length field, a wireless device that can potentially send transmissions that collide with a transmission from an LTE-LAA device may use the Primary Synchronization Signal (PSS) or Secondary Synchronization Signal (PSS) to decode the Physical Layer Cell ID (PCID) of the LAA transmission. The PCID of the LAA transmission may be used as a reference to further decode the transmission burst length. This enables the non-LAA devices to determine the duration of the transmission burst and accordingly defer their transmission for that duration.

Figure 6:
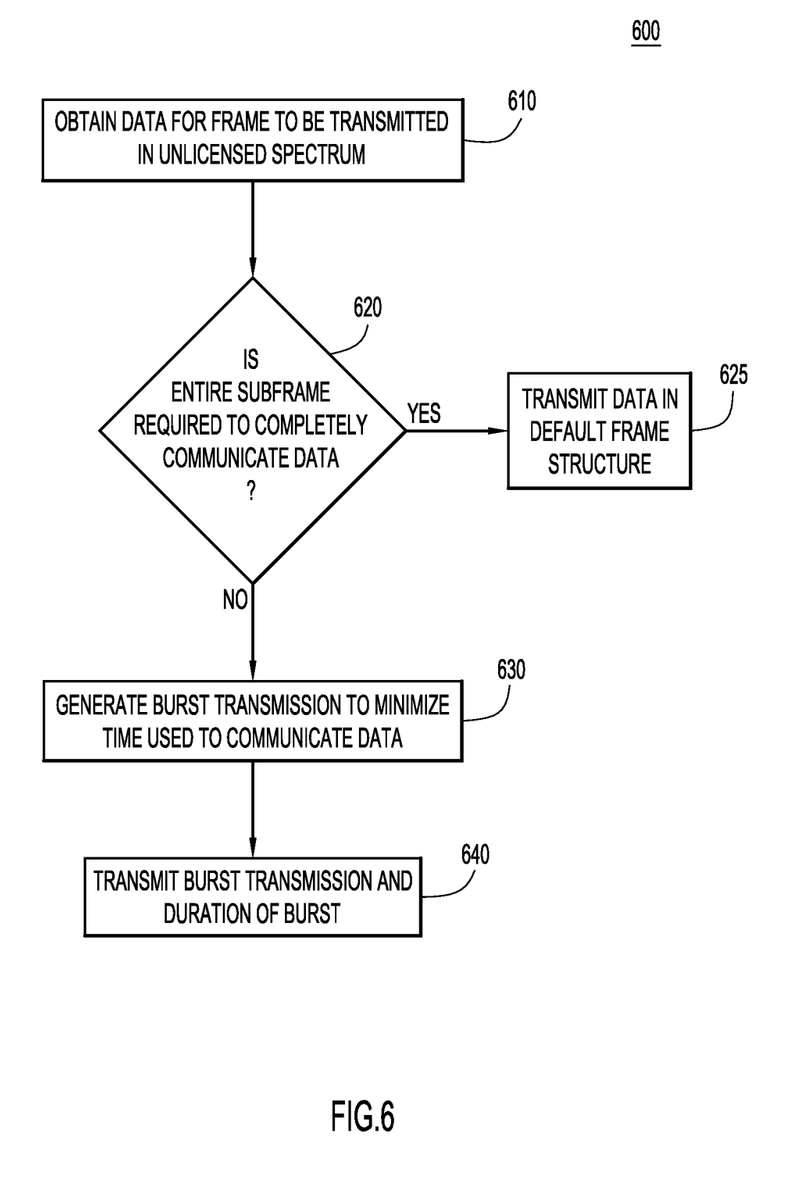
FIG. 6 illustrates a flowchart of operations performed by an LTE device according to an example embodiment.

Referring now to FIG. 6, an example process 600 shows the operations performed by a wireless device to efficiently share the unlicensed spectrum resources with other transmitters. In step 610, the data is obtained that is to be transmitted in a frame in an unlicensed/shared spectrum. At 620, it is determined whether an entire subframe is required to completely communicate data. If the entire subframe is required to completely communicate the data, as determined in step 620, then the device transmits, in step 625, the data in the default frame structure. If the data is small enough in size that it can be transmitted with fewer resource elements than are in the full subframe, then the device generates, in step 630, a burst transmission so as to minimize the time used to communicate the data. The device may generate the burst transmission to maximize the frequency spectrum (e.g., the number of subcarriers or the subcarrier spacing) and minimize the time spectrum (e.g., the number of time slots or the length of each time slot). In step 640, the device transmits the burst transmission along with a parameter indicating of the duration of the burst transmission. The parameter may be transmitted separately from the burst transmission.

To summarize, modifications to a frame/subframe structure are presented herein so that a device can transmit its data within a fraction of a subframe (as opposed to using an entirety of a subframe). This may be useful in unlicensed frequency channels where multiple radio access technologies (e.g. Wi-Fi, LTE) contend for medium access.

Using these methods, a given wireless device can maximize its usage of frequency resources and transmit its data within the shortest possible duration while maintaining its link budget. By facilitating a quick release of the time resource, the wireless link can ensure that other transmitter links gain fair access to the medium.

In one form, a computer-implemented method is provided for using a frame/subframe structure efficiently in an unlicensed spectrum. A device obtains data to be wirelessly transmitted in a frame in an unlicensed spectrum. The device determines whether an entire subframe of the frame is required to completely communicate the data. Responsive to determining that the data does not require the entire subframe, the device generates a burst transmission so as to minimize a time period of the subframe used to communicate the data. The device transmits the burst transmission and a parameter indicating the duration of the burst transmission.

In another form, an apparatus is provided comprising a transmitter, a modem, and a processor. The transmitter is configured to transmit a frame in an unlicensed spectrum. The modem is configured to modulate signals for transmission of the frame. The processor is configured to obtain data to be wirelessly transmitted by the transmitter. The processor is further configured to determine whether an entire subframe of the frame is required to completely communicate the data. Responsive to the processor determining that the data does not require the entire subframe, the processor is configured to generate a burst transmission so as to minimize a time period of the subframe used to communicate the data. The processor is further configured to cause the transmitter to transmit the burst transmission and a parameter indicating the duration of the burst transmission.

In yet another form, one or more non-transitory computer readable storage media are encoded with software comprising computer executable instructions. When the software is executed the instructions are operable to cause a processor to obtain data to be wirelessly transmitted in a frame in an unlicensed spectrum. The instructions cause the processor to determine whether an entire subframe of the frame is required to completely communicate the data. Responsive to determining that the data does not require the entire subframe, the instructions are operable to cause the processor to generate a burst transmission so as to minimize a time period of the subframe used to communicate the data. The instructions are operable to cause the processor to cause a transmitter to transmit the burst transmission and a parameter indicating a duration of the burst transmission.

The above description is intended by way of example only.

What is claimed is:

1. A method comprising:
    obtaining data to be wirelessly transmitted in a frame in an unlicensed spectrum;
    determining whether an entire subframe of the frame is required to completely communicate the data;
    responsive to determining that the data does not require the entire subframe, generating a burst transmission so as to minimize a time period of the subframe used to communicate the data by increasing a subcarrier spacing and decreasing a symbol transmission time;
    transmitting an indication of the subcarrier spacing via one or more channels in a licensed spectrum; and
    transmitting the burst transmission and a parameter indicating a duration of the burst transmission via the unlicensed spectrum.

2. The method of claim 1, further comprising muting a transmitter following completion of the transmission burst until an end-boundary of the subframe.

3. The method of claim 1, further comprising determining whether the unlicensed spectrum is clear to transmit the frame.

4. The method of claim 1, further comprising muting a remainder of the subframe after the time period used to communicate the data.

5. The method of claim 4, wherein the parameter is transmitted within the subframe and is an indication of the time period used to communicate the data.

6. The method of claim 5, wherein the indication of the time period used to communicate the data is transmitted in an initial symbol of the burst transmission.

7. The method of claim 5, wherein the frame is a Long Term Evolution (LTE) frame, and wherein the indication of the time period used to communicate the data is transmitted as part of a Physical Downlink Control Channel (PDCCH) or an Enhanced Physical Downlink Control Channel (EPDCCH).

8. The method of claim 7, wherein the indication of the time period used to communicate the data is transmitted as a two bit message in the PDCCH or the EPDCCH.

9. The method of claim 1, wherein increasing the subcarrier spacing comprises utilizing the full extent of the unlicensed spectrum for the transmission burst.

10. An apparatus comprising:
    a transmitter configured to transmit signals in an unlicensed spectrum and a licensed spectrum;
    a modem configured to modulate signals for transmission in a frame;
    a processor configured to:
        obtain data to be wirelessly transmitted by the transmitter;
        determine whether an entire subframe of the frame is required to completely communicate the data;
        responsive to determining that the data does not require the entire subframe, generate a burst transmission so as to minimize a time period of the subframe used to communicate the data by increasing a subcarrier spacing and decreasing a symbol transmission time;
        cause the transmitter to transmit an indication of the subcarrier spacing via one or more channels in the licensed spectrum; and
        cause the transmitter to transmit the burst transmission and a parameter indicating a duration of the burst transmission via the unlicensed spectrum.

11. The apparatus of claim 10, wherein the processor is further configured to determine whether the unlicensed spectrum is clear to transmit the frame.

12. The apparatus of claim 10, wherein the processor is configured to mute the transmitter after the time period used to communicate the data.

13. The apparatus of claim 12, wherein the processor is further configured to cause the transmitter to transmit the parameter indicating the duration of the burst transmission within the subframe, wherein the parameter is an indication of the time period used to communicate the data in an initial symbol of the burst transmission.

14. The apparatus of claim 12, wherein the frame is a Long Term Evolution (LTE) frame, and wherein the processor is further configured to cause the transmitter to transmit an indication of the time period used to communicate the data in the burst transmission as part of a Physical Downlink Control Channel (PDCCH) or an Enhanced Physical Downlink Control Channel (EPDCCH).

15. The apparatus of claim 10, wherein the processor is configured to increase the subcarrier spacing to utilize the full extent of the unlicensed spectrum for the transmission burst.

16. One or more non-transitory computer readable storage media encoded with software comprising computer executable instructions and when the software is executed operable to cause a processor to:
    obtain data to be wirelessly transmitted in a frame in an unlicensed spectrum;
    determine whether an entire subframe of the frame is required to completely communicate the data;
    responsive to determining that the data does not require the entire subframe, generate a burst transmission so as to minimize a time period of the subframe used to communicate the data by increasing a subcarrier spacing and decreasing a symbol transmission time;
    cause a transmitter to transmit an indication of the subcarrier spacing via one or more channels in a licensed spectrum; and
    cause the transmitter to transmit the burst transmission and a parameter indicating a duration of the burst transmission via the unlicensed spectrum.

17. The computer readable storage media of claim 16, wherein the instructions cause the processor to determine whether the unlicensed spectrum is clear to transmit the frame.

18. The computer readable media of claim 16, wherein the instructions cause the processor to mute the transmitter after the time period used to communicate the data.

19. The computer readable storage media of claim 18, wherein the instructions further cause the transmitter to transmit the parameter indicating the duration of the burst transmission within the subframe, and wherein the parameter is an indication of the time period used to communicate the data in an initial symbol of the burst transmission.

20. The computer readable storage media of claim 18, wherein frame is a Long Term Evolution (LTE) frame and wherein the instructions further cause the transmitter to transmit an indication of the time period used to communicate the data in the burst transmission as part of a Physical Downlink Control Channel (PDCCH) or an Enhanced Physical Downlink Control Channel (EPDCCH).

21. The computer readable storage media of claim 16, wherein the instructions cause the processor to increase the subcarrier spacing to utilize the full extent of the unlicensed spectrum for the transmission burst.

* * * * *